United States Patent Office 3,686,024
Patented Aug. 22, 1972

3,686,024
PROCESS OF MAKING A WATER-ABSORBENT COATED ARTICLE AND RESULTANT PRODUCT
Robert J. Nankee, Jack C. Lamphere, and Rodney A. Nelson, Midland, Mich., assignors to The Dow Chemical Company, Midland, Mich.
No Drawing. Filed Feb. 24, 1970, Ser. No. 13,835
Int. Cl. B32b 27/12; D06m 13/40
U.S. Cl. 117—140 A                11 Claims

ABSTRACT OF THE DISCLOSURE

Water-absorbent coated articles are prepared by contacting a fibrous material with a water-swollen gel and drying the coated material thereby obtained. Adherence of the gel is improved by pretreatment of the fibrous base with a cationic polymer such as polyethylenimine. Fabrics coated with gels such as cross-linked partially hydrolyzed polyacrylamide are useful in various applications where it is desirable to hold or absorb an aqueous fluid in a particular location.

BACKGROUND OF THE INVENTION

This invention relates to a process for coating a fibrous material with a water-swellable polymeric gel and to the product of such process. It relates particularly to woven and nonwoven fabrics coated with a substantial quantity of a gel such as a cross-linked water-swellable partially hydrolyzed polyacrylamide and to the processes for making and using such coated fabrics.

Bandages and absorbent pads containing powdered or granular water-absorbent materials such as polyoxyethylene sorbitol, carboxymethylcellulose, sodium alginate, or other such substance sprinkled or interspersed between layers of cotton, absorbent paper, or other cellulosic material are known and have been used to absorb and hold body fluids. Although such articles provide a useful means whereby substantially larger quantities of moisture can be absorbed than is possible with the untreated fabrics, it is often difficult to disperse the water-absorbent solid evenly throughout the pad or bandage and it is particularly difficult to keep the absorbent solid in place once it has been more or less evenly dispersed.

SUMMARY OF THE INVENTION

It has now been found that highly water-absorbent articles such as described above and similar articles for other water-absorbing or holding purposes avoid the disadvantages of the prior art combinations when they are prepared by impressing upon a fibrous base a water-swellable, essentially insoluble polymer which has been substantially swollen with water, then drying the coating of aqueous gel at a temperature of 100–200° C. to remove at least the major part of its water, thereby firmly bonding the dried gel to the fibrous support. A relatively adherent coating of dried gel on the fibrous support is obtained, producing a composite which has stable uniformity to the extent required and which has capacity for absorbing and holding a substantial quantity of water, a body fluid, or other aqueous fluid. Preferably, the polymer is a cross-linked partially hydrolyzed polymer of acrylamide or corresponding acrylamide-acrylate copolymer. For best results, the fibrous underlayer is first treated with a water-soluble cationic polymer such as polyethylenimine, a polyalkylenepolyamine, or a cationic derivative of polyacrylamide to increase adherence of the gel.

DETAILED DESCRIPTION

The invention is applicable in different ways to a number of varied uses. For example, the aqueous gel may be coated on one or both sides of a woven or unwoven fabric such as cotton cloth, rayon, wool, surgical gauze, burlap, or paper. Multilayer laminates can be made with two or more layers of the fabric base. Alternatively, the aqueous gel can be mixed with loose fibers of cellulose, asbestos, or other such material to make a composite sheet which itself may be bonded to a supporting sheet by the present process.

Polymers useful in the invention include crosslinked polymers and copolymers of acrylamide, polyacrylate salts, and polymers and copolymers of vinyloxazolidinone, vinylpyrrolidinone, methacrylate salts, and salts of styrene-sulfonates such as sodium polystyrenesulfonate and sodium polyvinyltoluenesulfonate, also styrene-maleic anhydride copolymers which have been cross-linked by reaction with a glycol, such polymers having the properties of being water-swellable but substantially insoluble in water. Particularly valuable in the present invention are cross-linked polymers of acrylamide made by a process such as that described by Walker et al., U.S. Pat. 3,247,171. For example, a solution of 2–20 percent acrylamide in water is polymerized in the absence of oxygen in the presence of 0.002–0.5 mole percent of a diene cross-linking monomer such as methylenebisacrylamide at 25–90° C. and with a water-dispersible free radical-initiating catalyst for causing ethylenic polymerization. The resulting polymer is then preferably hydrolyzed by treatment with sufficient alkali metal hydroxide to convert up to about 50 percent, preferably 10–40 percent, of the carboxamide group to alkali carboxylate. The hydrolyzed polymer is essentially composed of units having the formula

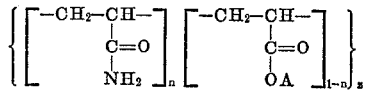

wherein A is an alkali metal ion such as sodium or potassium (or a hydrogen atom, $n$ is 0.5 to about 0.9, $1-n$ defines the extent of hydrolysis, and $z$ is the number of mer units between cross-links.

A polymer of similar molecular structure is made by copolymerizing acrylamide and acrylic acid or its alkali metal salt in the presence of a cross-linking monomer such as methylenebisacrylamide in the manner described. Such a polymer may have a somewhat higher proportion of carboxylate groups than shown by the above formula, for example, where $n=0.2$–0.9.

A polymer such as described above is applied to the fibrous base material as a water-swollen gel containing about 5–50% by weight of polymer, preferably about 8–15%, in a quantity representing about 0.005–200 parts of polymer per part by weight of the base. Preferably, about 0.2–5 parts by weight of polymer is applied to the fibrous substrate as the water-swollen gel.

For best adherence of the gel to the base in the finished product, the base is first treated with a cationic water-soluble polymer such as polyethylenimine, a polyalkylenepolyamine, or a cationic derivative of polyacrylamide such as that obtained by reacting a partially hydrolyzed polyacrylamide with formaldehyde and dimethylamine to produce a Mannich base wherein a substantial portion of the carboxamide groups have dimethylaminomethyl substituents. Of particular value for promoting gel adhesion to the fibrous base are water-soluble, essentially linear polymers of acrylamide in which at least five mole percent of the combined monomer units are N-dimethylaminomethylacrylamide moieties and the remaining units correspond to monoethylenically unsaturated monomers copolymerizable therewith, at least about half of the monomers being hydrophilic to insure water solubility of the finished copolymer. Such polymers are conveniently prepared by reacting polyacrylamide with sufficient formaldehyde and dimethylamine to convert about 5–35 percent of the carboxamide groups to N-(dimethylaminomethyl)carboxamide group. Ordinarily, a small proportion of carboxylate groups is also present in the polymer structure. The aminomethylation of polymeric amides is described in detail by Suen et al., Ind. Eng. Chem. 49, 2132 (1956) and by Grimm et al., U.S. Pat. 2,328,901. Other such cationic polymeric substances such as polyaminoalkyl acrylates and cationic starches obtained by reacting amines with modified starches can also be used in the same way to pre-treat the fibrous base for better gel adhesion. Dipping the fabric or other fibrous base in a dilute aqueous solution of the cationic polymer prior to coating with the gel is a convenient means of treatment. While any significant quantity of cationic polymer will be advantageous in the process, preferably about 0.1–5 percent by weight cationic polymer is applied to the fibrous base.

Application of the water-swollen gel to the fibrous base may be done by any conventional means. A convenient and effective method for making a uniform laminate sheet comprises running the gel and the supporting fabric together between heated rolls whereby the gel is uniformly spread and pressed into intimate contact with the fabric and, at the same time, dried to produce the finished article. The quantity of gel applied is easily controlled by varying the nip or space between the rolls. While any temperature in the range of 100–200° C. is operable, it is generally preferred to dry the laminated gel at about 150–180° C.

Another mode of the invention comprises the polymerization and gel formation in the presence of the fibrous base, for example, in a paper pulp slurry to produce a composite of water-swollen gel containing dispersed fibers. Such a composite can be used advantageously as the gel layer bonded to a sheet of paper or cloth by the method previously described.

The invention has other modes of operation and use. A partially hydrolyzed, lightly cross-linked polyacrylamide gel can be made by carrying out the polymerization of acrylamide in the presence of aqueous sodium carbonate as described by Proffitt, U.S. 3,022,279. The water-swellable gel can be produced in bead form by the inverse suspension polymerization of water-soluble monomer as described by Friedrich et al., U.S. 2,982,749 and the water-swollen beads then applied to a fabric backing. A combination of these or other known procedures as described above can be employed in the practice of the present invention for various applications.

Many uses are apparent for such laminates. For example, a laminate with absorbent paper can be used as a facial tissue with enhanced capacity for absorbed moisture. The same laminate can be used as the absorbing part of a disposable diaper. For such use, the laminate is preferably shredded for faster absorption. A laminate on heavy backing such as canvas or burlap can be used as a portable base for an ice rink. In such an application, the laminate has a coating of gel heavy enough to permit wetting the surface with enough water to start a suitable base, allowing it to freeze, and continuing to build up a proper rink surface by repeating the process. At the end of the skating season, the rink can be allowed to thaw and dry and the dried laminate can then be rolled up for storage and reuse or disposal. A similar laminate can be used in hot weather as a roof covering to hold water for evaporative cooling of a house. The covering is easily removable in cooler weather. Other uses for a laminate of the present invention include super-absorbent bandages and dressings, an undersheet or pad in a sick bed or baby bed, and a cover to retain moisture on a slope for skiing or sledding. Many other uses are easily apparent.

In a particular embodiment of the invention, the laminates are employed as moisture barriers in porous soil. Thus, for example, in preparing irrigation ditches, sheets of the dry laminates are laid on the bottom and sides of the excavation and are covered by backfilling with 4–12 inches of soil. Thereafter when percolating water reaches the polymer, the latter swells and plugs the interstices of the soil creating an effective moisture barrier.

Example 1

A suspension of 20 g. of unbleached soft wood sulfite pulp in 1363 g. of water was stirred while 617 ml. of 16.2% aqueous acrylamide was added. To this mixture was added 2.4 g. of Miranol J2M, the pH was adjusted from an original 6.8 to 6.3 by addition of sulfuric acid, and the resulting mixture was purged with nitrogen for about one-half hour at 40° C. Miranol J2M is an aqueous solution containing about 35% by weight of 1-[2-(carboxymethoxy)-ethyl]-1-(carboxymethyl)-2 - heptyl - 2-imidazolinium hydroxide, disodium salt. It is manufactured by the Miranol Chemical Company, Inc. and is used as a roll release agent. To the resulting suspension were added 0.15 g. of N,N'-methylenebisacrylamide, 0.2 g. of Versenex 80 (sodium salt of diethylenetriamine pentaacetic acid), 0.07 g. of tertiary butyl hydroperoxide, and 0.02 g. of potassium persulfate, and the mixture was heated at 68–70° C. for 10 minutes, then put in an 85° C. oven for 1.5 hours to finish the polymerization. The cooled soft gel product was ground up in a food chopper, 25.8 g. of 91.8% KOH was added, and the mixture was put in an oven at 85° C. for 5 hours. In the hydrolyzed product, 30% of the carboxamide groups had been converted to potassium carboxylate.

Example 2

A solution obtained by mixing 1480 ml. of 16.2% aqueous acrylamide, 520 ml. of water, and 4.8 g. of Miranol J2M was adjusted to pH 6.2 by addition of KOH and purged with nitrogen at 40° C. for about a half hour. To the solution was added 0.36 g. of N,N'-methylenebisacrylamide, 0.48 g. of Versenex 80, 0.17 g. of tertiary butyl hydroperoxide, and 0.05 g. of $K_2S_2O_8$ and the mixture was heated at 40–57° C. for 17 minutes, then put in an oven at 80° C. for 1.5 hours to finish the polymerization. A second batch of gelled polymer was prepared in the same way and the two products were mixed together. About 30 mole percent of 10% aqueous KOH (based on acrylamide) was added to the stirred gel and the mixture was left in an oven overnight at 80° C. The hydrolysis amounted to about 30.5% based on carboxylate group analysis.

Example 3

To 1520 ml. of 15.8% aqueous acrylamide (240 g. of acrylamide) there was added 4.8 g. of Miranol J2M and the solution was purged with nitrogen at 40° C. for one-half hour. At this time, 0.48 g. of Versenex 80, 0.17 g. of tertiary butyl hydroperoxide, and 0.05 g. of potassium persulfate were added and the solution was stirred and heated to 48° C., whereupon it became quite viscous some five minutes after the addition. A quantity of 0.48 g. of N,N'-methylenebisacrylamide was stirred into the polymerizing mixture, causing a further increase in viscosity to the point where stirring became very difficult after nine minutes. The polymerized mixture was then put in an oven at 85° C. for one hour, cooled, and put through a food chopper to break up the polymer gel. Aqueous 10% KOH containing 57 g. of KOH was stirred into the gel and the mixture was left in an oven at 85° C. overnight. In the resulting hydrolyzed gel, about 34% of the original amide groups had been converted to carboxylate radicals. The dried material, 94.2% solids, absorbed 794 g. of distilled water or 130 g. of synthetic hard water (300 p.p.m. $CaCl_2$+500 p.p.m. NaCl) per gram.

Examples 4–11

In the preparation of polyacrylamide gel lamintes, the water-swollen gel and the fabric or paper backing were fed together between two six inch diameter stainless steel rolls heated with low pressure steam (110–120 p.s.i.g.) to maintain a roll temperature of about 170° C. The rolls were operated at about one-half revolution per minute. A knife blade mounted along the surface of one roll peeled the dried laminate from the roll as it rotated. The polymer-backing ratio was varied by changing the gel composition, the roll nip, the type of fabric or paper used as backing, or by other appropriate means.

Laminates prepared from the gels of Examples 1–3 were tested for water absorbency by immersing 2.25 inch square samples in water for one hour, draining off excess water, and weighing the water-swollen laminate. A synthetic hard water containing 300 p.p.m. $CaCl_2$ and 500 p.p.m. NaCl was used for some samples, water containing 1.5% NaCl was used for others.

Laminate composition

| Gel from Ex. No. | Wt. percent polymer | Backing Type | Wt. percent | Soft wood pulp, percent | Average absorbency, grams of water per gram laminate |
|---|---|---|---|---|---|
| 1 | 85.4 | None | | 14.6 | 102 |
| 1 | 55 | Paper towel | 35 | 10 | 30 |
| 1 | 66 | Cotton gauze | 23 | 11 | 38 |
| 2 | 85–90 | Open mesh¹ diaper tissue | 10–15 | None | 160 |
| 2 | 80 | ____do____ | 20 | None | 106 |
| 3 | 54 | Cotton gauze | 46 | None | ²27 |
| 3 | 11 | Burlap | 89 | None | ²10 |
| 3 | 86 | Open mesh diaper tissue | 14 | None | ²48 |

¹ A commercial paper tissue disposable diaper.
² 1.5% NaCl solution.

When laminates are prepared as described in the foregoing examples using cloth or paper backing which has been pretreated with a cationic polymer, greatly improved adhesion of the polymer to the backing is obtained with some sacrifice of water capacity. Such pretreatment can be done by any convenient means of applying the cationic additive, but it is preferably accomplished by dipping the backing in a dilute aqueous solution of the cationic polymer.

Examples 12–16

A lightly cross-linked, partially hydrolyzed polyacrylamide gel substantially the same as those of Examples 1–3 was applied to various backings by the heated steel roll apparatus in the manner described in Examples 4–11, with and without predipping the fabric backing in a 0.5% aqueous solution of a cationic polymer as specified. The dried laminates thereby prepared were tested for absorbing capacity in grams per gram of laminate by immersing in 1.5% aqueous NaCl for 15 minutes and weighing after draining for 10 minutes. In some cases, samples were also immersed in pure water, drained and weighed in the same way.

| Ex. No. | Backing | Predip | Laminate composition Percent cationic | Percent gel. | Capacity, g. 1.5% NaCl |
|---|---|---|---|---|---|
| 12 | Paper towel | None | | 60.1 | ᵃ32 |
| 13 | do | CPA ¹ | 2.1 | 49.6 | ᵇ24 |
| 14 | do | PEI ² | 0.8 | 58.5 | ᶜ27 |
| 15 | do | PVA ³ | 1.0 | 60.0 | 28 |
| 16 | Cotton gauze | CPA ¹ | 3.4 | 27.7 | 18 |

¹ Polyacrylamide of about 1.5×10⁶ average molecular weight which had been reacted with dimethylamine and formaldehyde to make a polymer product containing about 35–50% by weight of N-(dimethylaminomethyl)-acrylamide units in its molecular structure.
² Polyethylenimine of about 1,200 average molecular weight.
³ Du Pont polyvinyl alcohol, Elvanol 51–05.
Absorbent capacity for pure water was:
ᵃ 334 g., ᵇ 258 g., ᶜ 288 g.

In the above experiments, the laminates made with a fabric which had been wet with the cationic polymer solution showed significantly increased adhesion of the gel. For example, the coated paper towel product of Example 12 lost some of the dried gel coating on shaking or bending whereas the gel adhered firmly to the paper backing in the products of Examples 13–15. Gel was also bonded securely to the treated cotton gauze in Example 16.

We claim:
1. A process for making a water-absorbent coated article which consists essentially of impressing upon a fibrous support 0.005–200 parts per part by weight of support of a water-swellable, substantially water-insoluble polymer as a gel substantially swollen with water, said polymer consisting essentially of units having the formula

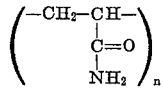

and

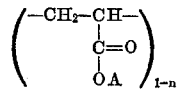

wherein A is an alkali metal ion or a hydrogen atom and $n$ is a number from about 0.2 to about 0.9 and 0.002–0.5 mole percent of diene crosslinking monomer units, and drying the composition thereby obtained at 100–200° C. to remove at least a major part of the water contained by the water-swollen gel, thereby bonding the dried gel to said fibrous support.

2. The process of claim 1 wherein the fibrous support is impregnated with 0.1–5% by weight of a water-soluble, cationic polymer prior to application of the water-swollen gel.

3. The process of claim 2 wherein the cationic polymer is a polyacrylamide wherein 5–35% of the carboxamide groups have been converted to N-(dimethylaminomethyl)-carboxamide groups.

4. The process of claim 2 wherein the polymer gel is a cross-linked polyacrylamide prepared by aqueous ethylenic polymerization in the presence of 0.002–0.5 mole percent of a diene cross-linking monomer and subsequently partially hydrolyzed with alkali metal hydroxide to convert 10–50 percent of the carboxamide groups in the polyacrylamide to carboxylate groups.

5. The process of claim 1 wherein the polymer is a cross-linked copolymer of acrylamide and acrylic acid or its alkali metal salt prepared by aqueous ethylenic polymerization in the presence of 0.002–0.5 mole percent of a diene cross-linking monomer.

6. The process of claim 1 wherein the water-swollen gel contains 5–50 percent by weight of said polymer.

7. The process of claim 6 wherein the fibrous support is a sheet of cellulosic fabric and the water-swollen gel is applied to one side of said sheet as a substantially uniform layer.

8. The process of claim 7 wherein the fabric is paper.

9. The process of claim 7 wherein the fabric is cotton cloth.

10. The water-absorbent coated article produced by the process of claim 1.

11. A disposable diaper comprising as the principal absorbent component thereof the product of claim 10 wherein the fibrous support is a non-woven cellulosic fabric.

(References on following page)

References Cited

UNITED STATES PATENTS

| | | | |
|---|---|---|---|
| 3,669,103 | 6/1972 | Harper et al. | 128—156 |
| 3,670,731 | 6/1972 | Harmon | 128—284 |
| 2,626,214 | 1/1953 | Osborne | 128—284 UX |
| 2,999,782 | 9/1961 | Justice et al. | 117—144 X |
| 2,328,901 | 9/1943 | Grimm et al. | 260—851 X |
| 3,483,016 | 12/1969 | McCool | 117—65.2 X |
| 3,370,590 | 2/1968 | Hokanson et al. | 128—290 |
| 2,486,806 | 11/1949 | Seymour et al. | 117—140 X |
| 2,835,606 | 5/1958 | Ladd | 117—47 X |
| 3,425,863 | 2/1969 | Honig et al. | 117—139.5 |
| 3,551,369 | 12/1970 | Shimizu | 117—161 X |
| 3,022,279 | 2/1962 | Proffitt | 260—80.3 X |
| 3,247,171 | 4/1966 | Walker et al. | 260—80.71 X |
| 3,026,293 | 3/1962 | Caldwell et al. | 117—145 X |
| 3,265,529 | 8/1966 | Caldwell et al. | 117—135.5 |
| 3,521,993 | 7/1970 | Swidler et al. | 117—143 X |

WILLIAM D. MARTIN, Primary Examiner

H. J. GWINNELL, Assistant Examiner

U.S. Cl. X.R.

117—143 A, 155 UA, 161 UT; 128—284